United States Patent [19]

Fohr et al.

[11] Patent Number: 4,682,813
[45] Date of Patent: Jul. 28, 1987

[54] UNDERSEAT TACKLE CONTAINER

[76] Inventors: Robert D. Fohr, 9100 Racine Ave.; Jeffrey E. Tieze, 3529-90th St., both of Sturtevant, Wis. 53177

[21] Appl. No.: 858,690

[22] Filed: May 2, 1986

[51] Int. Cl.4 .............................................. A47C 7/62
[52] U.S. Cl. .................................. 297/192; 108/151; 248/218.4; 297/349
[58] Field of Search ....................... 297/188, 192, 349; 108/151; 248/218.4, 219.2, 219.3; 312/235 R

[56] References Cited

U.S. PATENT DOCUMENTS

| 2,673,601 | 3/1954 | Fischer et al. | 297/192 X |
| 3,107,119 | 10/1963 | Watts | 297/192 X |
| 3,223,467 | 12/1965 | Jafelice | 108/151 X |
| 3,623,683 | 11/1971 | Bennett | 297/192 X |
| 3,975,068 | 8/1976 | Speckin | 108/151 X |
| 4,500,059 | 2/1985 | Papizan | 297/192 X |

FOREIGN PATENT DOCUMENTS

| 2724067 | 12/1978 | Fed. Rep. of Germany | 297/192 |
| 633548 | 1/1928 | France | 297/192 |

Primary Examiner—Kenneth J. Dorner
Assistant Examiner—Peter R. Brown
Attorney, Agent, or Firm—Peter N. Jansson

[57] ABSTRACT

A tackle container assembly mountable below a deck-mounted pedestal seat, including an upper principal member secured to the lower surface of the seat and means depending therefrom to support one or more containers in positions spaced well above the deck, such that fishing tackle can be readily accessible to a fisherman without interfering with or limiting the position of his feet beneath the seat or his hands and arms during fishing movements. Preferred embodiments include a slotted arrangement and/or spacers to allow good utilization of as much space beneath the pedestal seat.

20 Claims, 10 Drawing Figures

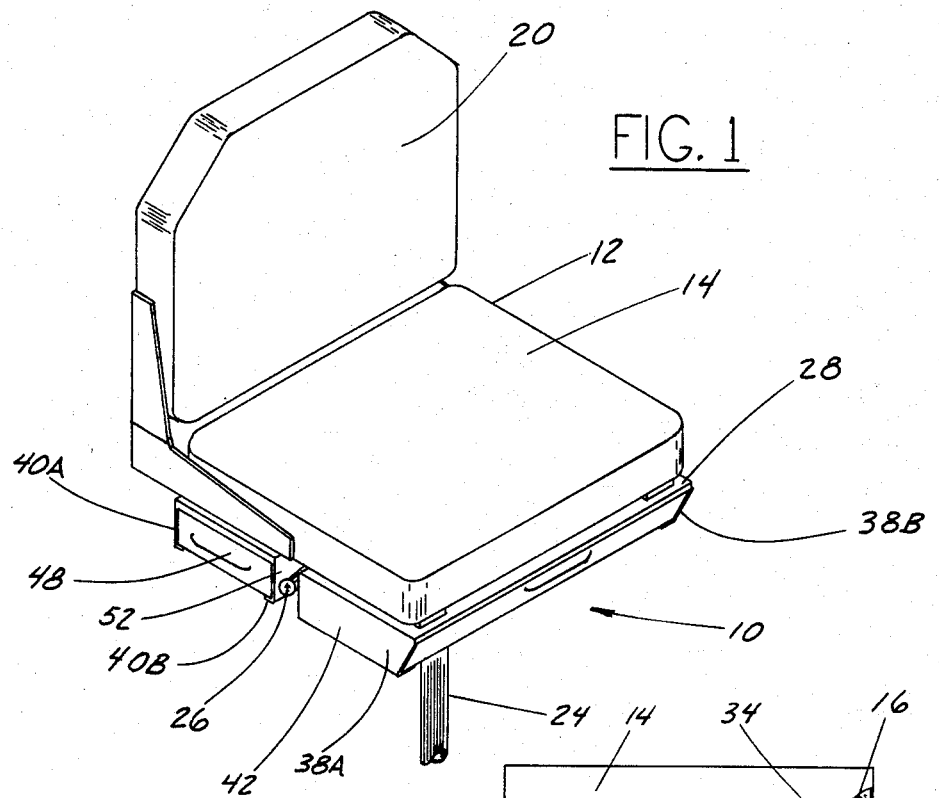
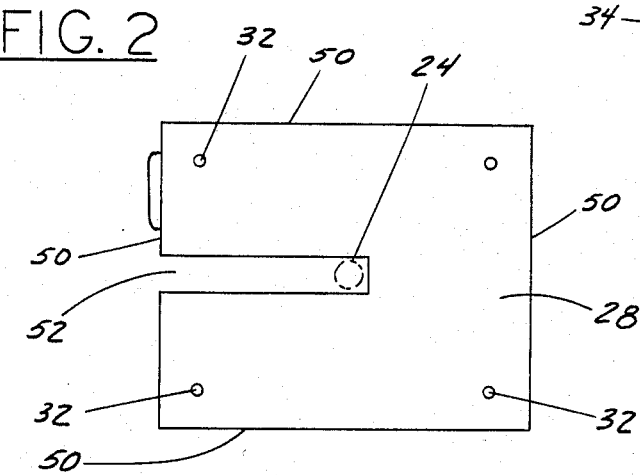
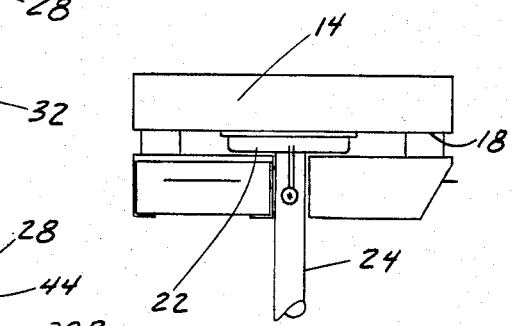
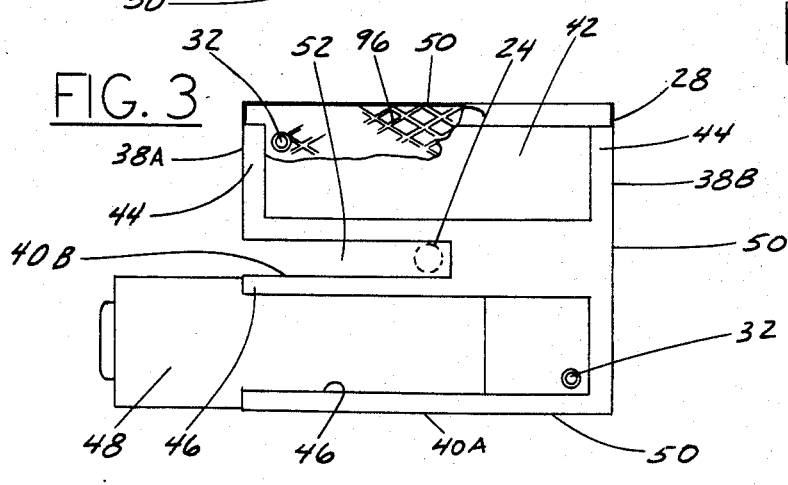

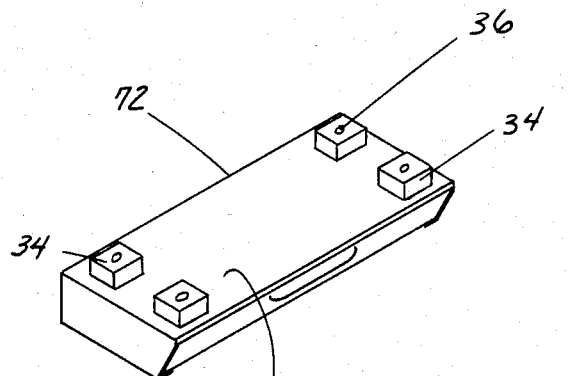
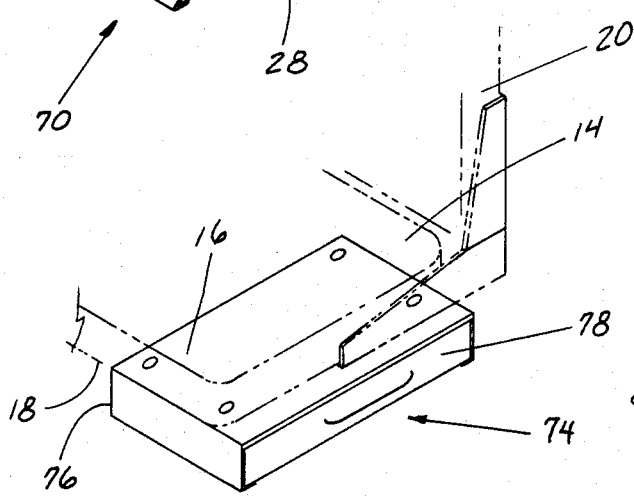
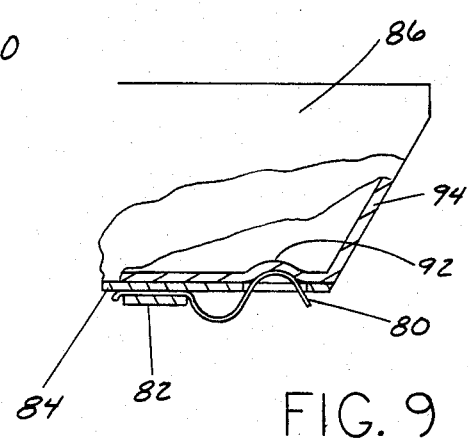
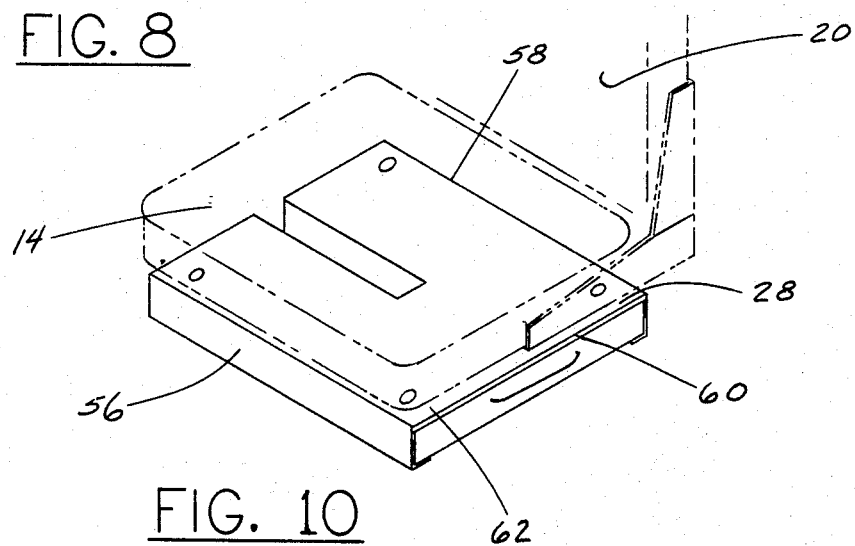

UNDERSEAT TACKLE CONTAINER

FIELD OF THE INVENTION

This invention is related generally to fishing tackle and, more particularly, to accessible tackle containers for use while seated in a fishing boat.

BACKGROUND OF THE INVENTION

Serious-minded sport fishermen frequently exercise their skills from deck-mounted pedestal swivel seats on their fishing boats. In the ideal situation, such fishermen can easily reach or manipulate a number of items and implements while seated on such pedestal seats. Various items relating to their fishing activity are placed within their easy reach, such as the foot pedal controls for their electric trolling motors, fish locating gauges, and the like. This helps fishermen to concentrate on their fishing.

However, in many cases the items which fishermen handle most frequently are not easily accessible. More specifically, the small paraphernalia stored in tackle boxes, such as hooks, lures, leaders and the like, may not be easily reached because the fisherman has to reach down to the deck or across the deck to his tackle box to get them. And, if a tackle box is placed on the deck beneath the pedestal seat, it may be in the way of the fisherman's feet, particularly when he rotates his pedestal seat to a new position, as is frequently done.

The prior art includes many devices for accessible storage of fishing tackle, including a number of storage devices which are part of or are associated in some way with a chair or seat for fishing or the like. Included in the prior art are the disclosures of the following U.S. Pat. Nos.: 2,692,007, 2,718,088, 4,067,607, 4,103,965, 4,184,281, 4,191,420, 4,379,587, 4,428,617.

Some devices of the prior art have provision for storage compartments at some position underneath stools or chairs of various kinds. However, there is a need for a tackle container assembly which accommodates the needs of fishermen using pedestal swivel seats without interfering with one of the functional advantages of such seats—the freedom to place one's feet at any position underneath the seat which is comfortable and which gives the proper balance and support during fishing casting, reeling and other fishing actions.

Some other devices of the prior art have tackle-containing structures besides a seat, for example, attached to the arms of a seat. This provides a high level of accessibility, but at the same time may interfere significantly with the fisherman's freedom of movement and action.

So in most cases fishermen who fish from pedestal chairs place their tackle boxes on the boat deck, where it is often in the way of their feet or in the way of other equipment and/or where it may be rather difficult to reach. When sitting on the boat deck, tackle boxes are typically in the hot sun and may become very hot inside. This can be harmful to certain plastic pieces, such as artificial baits and other items, even causing them to melt. But to place the tackle box out of the sun may require that it be at a location even more remote from the pedestal seat.

It suffices to note that despite the many developments in this field and despite the popularity of fisherman's pedestal swivel seats, there is a need for an improved accessible tackle container assembly which is useful to fishermen who fish from pedestal seats. More specifically, there is a need for a tackle container assembly which does not interfere with the fisherman's activities around the pedestal seat and does not limit his freedom of foot movement, including freedom to place his feet on the deck at any position around and under the pedestal seat as he swivels to different positions during his various fishing activities.

SUMMARY OF THE INVENTION

This invention is a tackle container assembly which is mountable below a deck-mounted pedestal swivel seat. Such seats are of the type having a seat lower surface, a pedestal plate centrally mounted thereon, and a pedestal post extending downwardly to the boat deck and attached to it by a pedestal deck plate or otherwise.

The tackle container assembly itself includes an upper principal member, means to secure such upper principal member to the seat lower surface, and means depending from the upper principal surface to support one or more containers in position spaced above the boat deck. Such spacing allows the feet of the fisherman sitting in the seat to readily be placed anywhere beneath the seat on the deck, including at positions against or even around the pedestal post as is often done to brace the fisherman for casting and other fishing actions.

In preferred embodiments, the container-supporting means, which extend downwardly from and are preferably integrally formed with the upper principal member, includes at least one pair of opposed slide means. Such slide means serve to slideably support opposite edges of a container, such that it may be slid in drawer-like fashion to an exposed position away from its normal position beneath the pedestal seat. There is preferably a pair of such opposed slide means for each container. Such slide means are preferably inwardly-extending horizontal ledges.

In certain preferred embodiments, there is an opening between the opposed ledges or other slide means which, when the container supported thereby is removed, is sufficient to make the upper principal member directly accessible from below for easy installation of the assembly with the pedestal seat. That is, the means to secure the upper principal member to the seat lower surface, which may be bolts, wood screws or the like, can readily be connected to the seat lower surface, through the upper principal member, by directly reaching such bolts, screws or other securing means from a position below the assembly.

In highly preferred embodiments, spacer means are sandwiched between the upper principal member and the seat lower surface. Such spacer means, which may be blocks with holes through which the aforementioned fasteners extend, have a vertical dimension equal to or greater than the vertical dimension of the pedestal plate by which the pedestal is mounted on the seat lower surface.

Such spacers accommodate the vertical dimension of the pedestal plate, which is typically a rather bulky casting, such that the tackle container assembly can be situated closely adjacent to the typically much narrower pedestal post. Such spacers are helpful because the width of the pedestal plate is much greater than the pedestal post itself, and, without such spacers, the tackle container assembly would be directly against the seat lower surface where the pedestal plate would prevent the tackle container assembly from being mounted anywhere near the axis defined by the pedestal post.

In highly preferred embodiments, the tackle container assembly of this invention is slotted, with the lateral edge of the assembly, when it is is mounted with respect to a pedestal chair, extending on opposite sides of the pedestal post. In such embodiments, a top-to-bottom slot extends inwardly from one point along the lateral edge to a central position to accommodate the pedestal post. This allows the tackle container assembly to be located beneath all or most of the seat, and thereby provides greater under seat storage capacity.

In such preferred embodiments, there are preferably at least two containers supported by the slotted upper principal member. One of these may be a container which slides in a forward direction for removal and another may be a container which slides to one side of the pedestal seat.

In one highly preferred embodiment, a single container is used in a slotted tackle container assembly. Such container has first and second lateral portions which straddle the pedestal post and a wider front portion which extends across between such lateral portions. Each of these portions may be used for storage of tackle. A particular advantage of this configuration is the fact that it allows a relatively large container, provided it has a closed top, to be entirely removed for overnight tackle storage away from the boat and then slid back into position beneath the seat for use again later.

In highly preferred embodiments, the tackle container assembly of this invention has a front with a lower edge which is closer to the axis of the pedestal post than its upper edge. That is, the front of the tackle container assembly has a slanted surface which facilitates placement of the legs of the person sitting in the seat at an angle such that his feet can be beneath the seat, for example, at a position against the pedestal post.

OBJECTS OF THE INVENTION

It is an object of this invention to provide a tackle container assembly overcoming some of the problems and shortcomings of devices of the prior art.

Another object of this invention is to provide a tackle container assembly making tackle very easily accessible to fishermen who are fishing on deck-mounted pedestal seats.

Another object of this invention is to provide a tackle container assembly which is highly accessible to a fisherman on a pedestal seat yet does not interfere either with placement of his feet at different deck positions beneath the seat or with various reaching motions by his arms and hands.

Another object of this invention is to provide an accessible tackle container assembly for use while sitting on a deck-mounted pedestal seat which shields a tackle container from direct sunlight which can overheat and spoil some fishing tackle.

These and other objects will be apparent from the following additional descriptions and from the drawings, wherein:

BRIEF DESCRIPTION OF THE DRAWINGS

FIG. 1 is a perspective view of a tackle container assembly in accordance with this invention secured beneath a deck-mounted pedestal seat.

FIG. 2 is a top plan view of the tackle container assembly of FIG. 1, with the spacer blocks and fasteners removed.

FIG. 3 is a partially cut-away bottom plan view, with one of two containers in a partially removed position.

FIG. 4 is a partially cut-away front elevation, including a portion of the pedestal seat for reference.

FIG. 5 is a left side elevation.

FIG. 7 is a perspective view, without the pedestal seat, of another embodiment of this invention.

FIG. 8 is a perspective view of yet another embodiment, with portions of a pedestal seat illustrated in phantom lines.

FIG. 9 is an enlarged fragmentary partially sectional view illustrating a locking mechanism which may be used with this invention.

FIG. 10 is a perspective view of another slotted embodiment of the invention, but having a single drawer straddling the pedestal post of a pedestal chair, which is partially illustrated in phantom lines.

DETAILED DESCRIPTIONS OF PREFERRED EMBODIMENTS

Figure 6:
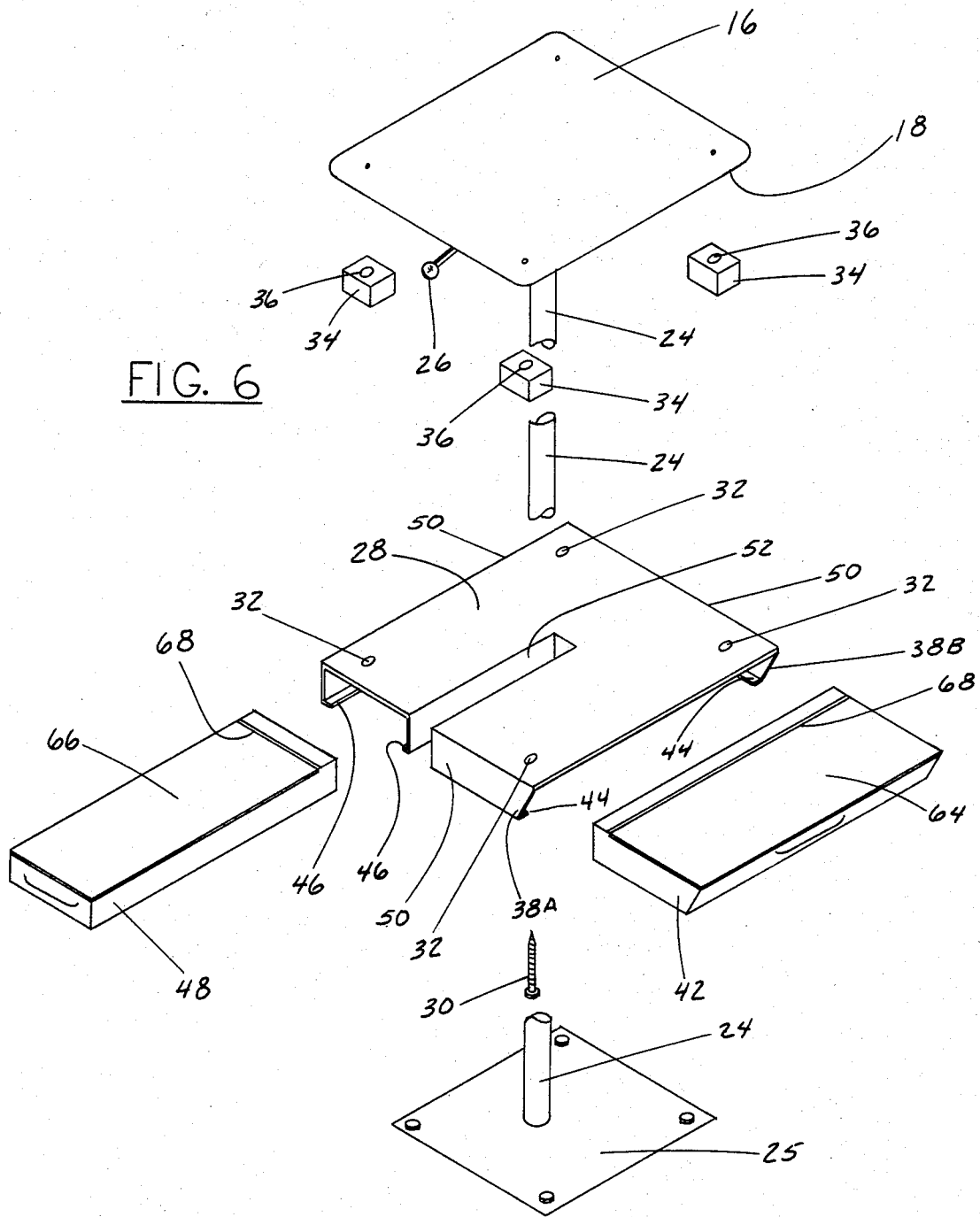
FIG. 6 is an exploded perspective view.

FIGS. 1-6 illustrate one preferred tackle container assembly 10. In some of the figures, tackle container assembly 10 is shown mounted below a pedestal swivel seat 12. Pedestal seat 12, which is a typical pedestal seat of the type widely used on fishing boats, includes a seat cushion 14 which is on top of a cushion support member 16. The bottom surface 18 of cushion support member 16, which is most often referred to herein as a seat lower surface 18, is the part of the pedestal seat to which the tackle container assembly of this invention is attached.

Pedestal seat 12 also includes a back portion 20, a pedestal plate 22 (see FIGS. 4 and 5) which is secured to seat lower surface 18, and a pedestal post 24 which extends downwardly from pedestal plate 22 in vertical orientation. Pedestal post 24 is attached to the boat deck through a pedestal deck plate 25.

Pedestal seat 12 may be swivelled such that the fisherman sitting thereon can readily turn his seat in any direction. Pedestal seat 12 also typically includes a height adjustment lever 26 which extends laterally from pedestal plate 22 to a position near the edge of cushion support member 16, as shown in FIGS. 1, 4, 5 and 6. Movement of height adjustment lever 26 may open an air valve which allows the weight of the person sitting on pedestal seat 12 to adjust it to a lower position, or, when there is no weight on the seat, to allow it to be adjusted to a higher position.

Referring now more specifically to the invention, tackle container assembly 10 includes an upper principal member 28 which is secured to lower seat surface 18 by means of fasteners 30. As best illustrated in FIG. 6, fasteners 30 extend through holes 32 and into and through lower seat surface 18. When cushion support member 16, which forms lower seat surface 18, is plywood, as is usually the case, fasteners 30 are preferably wood screws. A fastener 30 extends through upper principal member 28 near each of its four corners.

Spacer blocks 34 are sandwiched between upper principal member 28 and seat lower surface 18 to support upper principal member 28 at a level spaced below seat lower surface 18. Spacer blocks 34 have holes 36 extending therethrough allowing fasteners 30 to extend through them and hold them in place while they perform their spacing function. Spacer blocks 34 are chosen to have a vertical dimension at least as great as the greatest vertical dimension of pedestal plate 22, which is typically a bulky casting. This allows upper principal member 28 to be located at a position below pedestal plate 22, which in turn allows tackle container assembly 10 to be closely adjacent to pedestal post 24.

Tackle container assembly 10 has two pairs of downwardly extending container support members 38A and B and 40A and B which are integrally formed with upper principal member 28. Each of the pairs 38 and 40 of container support members forms opposed slide means slidably supporting a container immediately below upper principal member 28.

Support members 38A and 38B support opposite edges of a front container 42 in a manner allowing front container 42 to be slid from its normal position beneath upper principal member 28 to an exposed position adjacent to its storage position beneath pedestal seat 12. More specifically, front container 42, which spans the width of pedestal seat 12, slides in a forward direction in drawer-like fashion out from under pedestal seat 12 where its contents can readily be reached.

Container support members 38A and 38B include inwardly extending horizontal ledges 44 which are beneath front container 42, and provide opposed slide means for front container 42. The opposed horizontal ledges 44 have a void space between them. When front container 42 is slid away from its position beneath upper principal member 28, as shown in FIG. 6, there is sufficient space between the opposed horizontal ledges 44 such that upper principal member 28 is directly accessible from below for easy installation of the assembly. Such installation is accomplished by fasteners 30 in the manner previously described.

Container support members 40A and 40B are similar to container support members 38A and 38B. Support members 40A and 40B each have an inwardly extending horizontal ledge 46. Horizontal ledges 46 together support a side container 48 which extends across the full width of pedestal seat 12. Side container 48 functions in the same manner as front container 42, except that it is removed by sliding laterally to the right of the person sitting in pedestal seat 12.

As illustated best in FIGS. 2 and 3, tackle container assembly 10 extends closely adjacent to pedestal post 24. FIG. 3 illustrates that front container 42 and side container 48 may be dimensioned to use nearly all of the space beneath pedestal seat 12.

Tackle container assembly 10 has a lateral edge 50, as illustrated in FIG. 2 and elsewhere, which extends on opposite sides of pedestal post 24. This is made possible by a top-to-bottom slot 52 in tackle container assembly 10 which extends inwardly from one side of lateral edge 50 to accommodate pedestal post 24. This highly preferred slotted assembly provides a greater under-seat storage capacity, regardless of the form or forms of the containers forming a part of such assembly.

Tackle container assembly 10 is one preferred form of the invention which includes two containers, front container 42 and side container 48. FIG. 10 represents another preferred slotted embodiment, having a single container 54 which includes first and second lateral positions 56 and 58, respectively, one on either side of pedestal post 24 (not shown in FIG. 10). Container 54 includes a spanning portion 60 which joins lateral portions 56 and 58.

To remove container 54, the person sitting in the pedestal seat slides container 54 laterally, to his left, to whatever extent is necessary. Container 54 takes full advantage of space available beneath pedestal seat 12. Furthermore, when container 54 has its own closed top 62, the entire container can be conveniently removed and carried away, and later conveniently slipped under pedestal seat 12 for use while fishing.

The containers of the tackle container assemblies of this invention may take a variety of forms. It is preferred that they have their own covers, as just described with respect to container 54. For example, containers 42 and 48 have covers 64 and 66, respectively. Each of such covers includes a hinge line 68 which is removed from the back upper edge of its respective container. This allows the cover to be lifted without completely removing the container from the pair of horizontal ledges which support it.

However, in some cases it may be preferable to have opentop containers. Regardless of whether containers have their own covers, their positions beneath pedestal seat 12 serve to shield them from most direct sunlight, and thus keep them and their contents from overheating. And, the containers are also protected from rain which can cause rust or corrosion of metal parts.

FIGS. 7 and 8 illustrate two alternate embodiments of this invention, neither of which includes a slot. Tackle container assembly 70, shown in FIG. 7, includes spacer blocks 34 which allows tackle container assembly 70 to be spaced closely adjacent to the pedestal post (not shown). That is, spacer blocks 34 serve to locate the main portions of the tackle container assembly 70 at a level below the pedestal plate (not shown), such that assembly rear edge 72 can be close to the pedestal post.

Tackle container assembly 74, shown in FIG. 8, has no spacers and is mounted in direct contact with lower seat surface 18. Rear edge 76 is as close to the pedestal as is possible, and container front 78 protrudes somewhat to the left side of the pedestal seat, at a position where it will not interfere with the legs of the person on the seat.

FIG. 9 illustrates a locking mechanism which includes a leaf spring 80 which is secured by attachment means 82 to the underside of a horizontal slide ledge 84 on which container 86 is supported. Horizontal slide ledge 84 includes an opening 88 through which a curved portion 90 of leaf spring 80 protrudes to be in contact with the bottom of container 86. Container 86 has detents 92 formed therein, including a detent (as shown) near container front 94 and another similar detent (not shown) near the back edge (not shown) of container 86.

The spring engagement of leaf spring 80 with the front detent 92 serves to hold container 86 in full nested engagement with its upper principal member. And, when container 86 is slid outwardly, the engagement of leaf spring 80 with the rear detent will provide a resistance against further motion to remove container 86. However, such engagement will not prevent full removal, as previously described. A wide variety of locking mechanisms can be built into the tackle container assemblies of this invention if this feature is desired.

The vertical dimensions of tackle container assemblies in accordance with this invention are preferably limited enough such that the assemblies do not interfere in the slightest with placement of one's feet on the deck against the pedestal, a common posture for fishermen. The tackle container assembly of this invention provides complete tackle accessibility without any of the disadvantages mentioned above.

The full advantages and comfort of pedestal seats on fishing boats are available despite the close and handy location of the tackle container assemblies of this invention. In certain preferred embodiments, as shown in FIGS. 1, 5, 6 and 7, the tackle container assemblies, particularly the portions along the pedestal seat fronts, have lower edges which are closer to the pedestal post than the upper edges. This slant-front configuration facilitates placement of one's feet beneath the seat, and/or allows the use of tackle container assemblies of greater vertical dimension than otherwise would be possible.

As illustrated in FIG. 3, upper principal member 28, which is preferably made of a variety of tough plastics, includes cross-ribbing 96 to reinforce it. As previously noted, upper principal member 28 and its depending container support members are preferably integrally formed, using well-known plastic forming methods. Acceptable plastics include high-density polypropylene, polystyrene, polyvinyl cloride and nylon, to name just a few. A wide variety of other materials may be used, such as aluminum and other light-weight metals.

Similarly, the containers which are inserted under upper principal member 28 may be made of plastics or a wide variety of other materials. Acceptable materials and manufacturing methods would be well known to those skilled in the art who are familiar with this invention.

While the principles of this invention have been described in connection with specific embodiments, it should be understood clearly that these descriptions are made only by way of example and are not intended to limit the scope of the invention.

What is claimed is:

1. A tackle container assembly mountable below a deck-mounted pedestal seat having a seat lower surface and a pedestal plate centrally mounted thereon with a pedestal post extending therefrom, comprising:
   an upper principal member extending on either side of said pedestal, said upper principal member having a lateral opening extending from one edge toward the center of the upper principal member to accommodate the pedestal;
   means to secure the upper principal member with respect to the seat lower surface;
   means depending from the upper principal member on either side of said pedestal to support container means on either side of said pedestal in position spaced from the deck,
   whereby substantial accessible storage space is available while still allowing the feet of someone in the seat to readily be placed beneath the seat on the deck against the pedestal post.

2. The tackle container assembly of claim 1 wherein the container-supporting means comprises at least one pair of opposed slide means slideably supporting opposite edges of a container, such that the container may be slid to an exposed position away from beneath the seat.

3. The tackle container assembly of claim 2 wherein the opposed slide means comprise ledges extending beneath the container.

4. The tackle container assembly of claim 2 wherein with the container means removed from the assembly there is sufficient space between the opposed slide means such that the upper principal member is directly accessible from below for easy installation of the assembly.

5. The tackle container assembly of claim 1 wherein the securing means comprising fasteners extending through the upper principal member and into the seat lower surface.

6. The tackle container assembly of claim 1 further including spacer means between the upper principal member and the seat lower surface, thereby accommodating the vertical dimension of the pedestal plate to allow the assembly to be closely adjacent to the pedestal post.

7. The tackle container assembly of claim 6 wherein the securing means comprises fasteners extending through the upper principal member and into the seat lower surface, said fasteners extending through the spacer means thereby to hold them in place.

8. The tackle container assembly of claim 7 wherein the container-supporting means comprises at least one pair of opposed slide means slideably supporting opposite edges of a container, such that the container may be slid to an exposed position away from beneath the seat.

9. The tackle container assembly of claim 8 wherein the opposed slide means comprise ledges extending beneath the container.

10. The tackle container assembly of claim 9 wherein with the container means removed from the assembly there is sufficient space between the opposed slide means such that the upper principal member is directly accessible from below for easy installation of the assembly.

11. The tackle container assembly of claim 1 having a front with a lower edge and an upper edge, the lower edge being closer to the axis of the pedestal post thereby to facilitate placement of one's feet beneath the seat.

12. The tackle container assembly of claim 1 wherein the lateral opening is a slot with substantially parallel slot edges on opposite sides of and adjacent to the pedestal post, thereby to provide greater underseat storage capacity.

13. The tackle container assembly of claim 12 wherein said container means comprises at least two containers which are supported by the container-supporting means.

14. The tackle container assembly of claim 13 wherein the container-supporting means comprises at least two pairs of opposed slide means, each pair slideably supporting opposite edges of one of the containers, such that it may be slid to an exposed position away from beneath the seat.

15. The tackle container assembly of claim 14 wherein each pair of the opposed slide means comprises ledges extending beneath one of the containers.

16. The tackle container assembly of claim 12 wherein the securing means comprises fasteners extending through the upper principal member and into the seat lower surface.

17. The tackle container assembly of claim 12 further including spacer means between the upper principal member and the seat lower surface, thereby accommodating the vertical dimension of the pedestal plate to allow the assembly to be closely adjacent to the pedestal post.

18. The tackle container assembly of claim 17 wherein the securing means comprises fasteners extending through the upper principal member and into the seat lower surface, said fasteners extending through the spacer means thereby to hold them in place.

19. The tackle container assembly of claim 18 wherein with the container means removed from the assembly there is sufficient space between the opposed slide means such that the upper principal member is directly accessible from below for easy installation of the assembly.

20. The tackle container assembly of claim 12 wherein the container means comprises only a single container, such container having first and second lateral portions, one for either side of the pedestal post.

* * * * *